a = $H_2O$ + HAcr + HAc
b = HAcr + HAc + FC + SC + $H_2O$
c = RAFFINATE
d = HAc + $H_2O$
e = FC + SC
f = FC + SC + HAc (AND $H_2O$)
g = HAcr + HAc + FC + SC (AND $H_2O$)
h = FC + Sc
i = HAcr
j = FC + SC + HAc (AND $H_2O$)
k = FC + SC

HAc = ACETIC ACID
HAcr = ACRYLIC ACID
FC = FIRST COMPONENT
SC = SECOND COMPONENT

RAFFINATE = HAc, $H_2O$, FC AND SC a = $H_2O$ + HAcr + HAc
b = HAcr + HAc + FC + SC + $H_2O$
c = RAFFINATE
d = HAc + $H_2O$
e = FC + SC f = FC + SC + HAc (AND $H_2O$)
i = HAcr
j = FC + SC + HAc (AND $H_2O$)
k = FC + SC

HAc = ACETIC ACID
HAcr = ACRYLIC ACID

FC = FIRST COMPONENT
SC = SECOND COMPONENT
RAFFINATE = HAc, $H_2O$, FC AND SC

United States Patent Office 3,433,831
Patented Mar. 18, 1969

3,433,831
SEPARATION AND PURIFICATION OF ACRYLIC ACID FROM ACETIC ACID BY SOLVENT EXTRACTION AND AZEOTROPIC DISTILLATION WITH A TWO COMPONENT SOLVENT-ENTRAINER SYSTEM
Akira Yomiyama, Tokyo, Tsuneyuki Kato, Yokohama, Atsushi Aoshima, Kawasaki-shi, and Tokuichiro Kawanishi, Yokohama, Japan, assignors to Asahi Kasei Kogyo Kabushiki Kaisha, Osaka, Japan, a corporation of Japan
Filed June 29, 1966, Ser. No. 561,511
Claims priority, application Japan, June 30, 1965, 40/38,905, 40/38,906
U.S. Cl. 260—526                                                               7 Claims
Int. Cl. C07c 51/46, 51/48, 51/42

ABSTRACT OF THE DISCLOSURE

A method for separating acrylic acid from a mixture of acrylic and acetic acids by distilling the mixture at a pressure of less than 350 mm. Hg in the presence of a polymerization inhibitor and an entrainer consisting of a first component which is at least one member of the group consisting of aliphatic and alicyclic hydrocarbons of 7 carbon atoms and toluene and a second component which is at least one member of the group consisting of water, esters of the formula $R_1COOR_2$, wherein $R_1$ is a hydrocarbon radical of 1–3 carbon atoms and $R_2$ is a hydrocarbon radical of 1–4 carbon atoms and nitriles of 3–4 carbon atoms; said first and second components being present in a molar ratio of 1:0.05–1.5.

---

Figure 1:
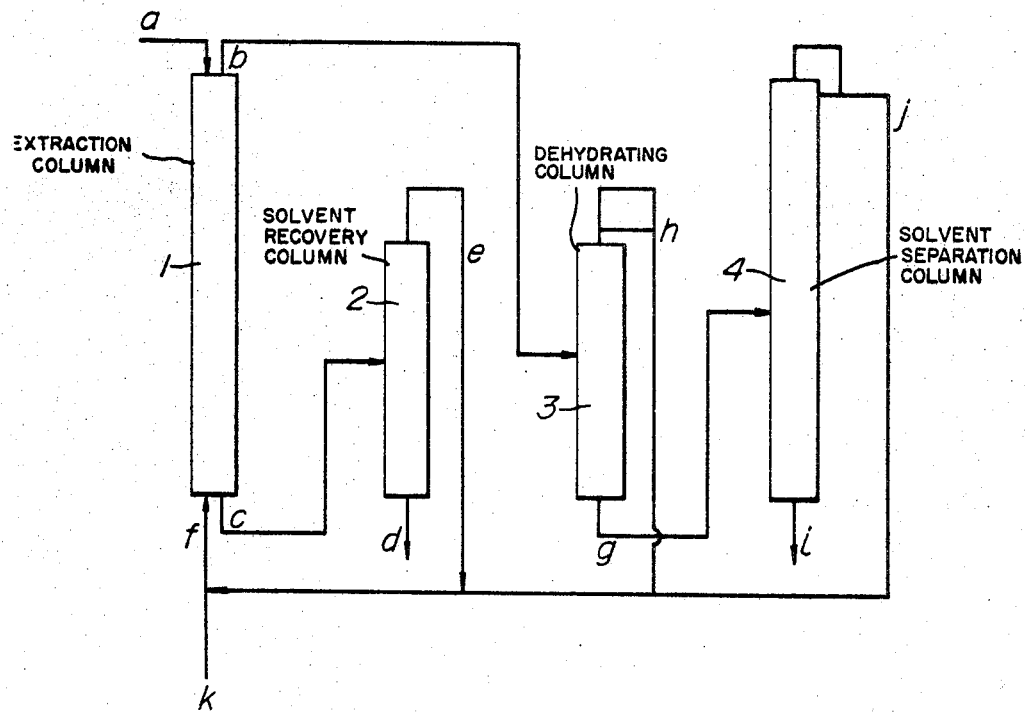

A number of studies have been made on a method for producing acrylic acid by vapor phase oxidation of propylene or acrolein. However, studies on refining already produced acrylic acid have been relatively rare. Generally, in crude acrylic acid produced by the aforesaid vapor phase oxidation acetic acid as by-product is contained in a proportion of from ¼ to ⅟₅₀₀ by mol based on the acrylic acid. Accordingly, from an industrial point of view the separation of acetic acid from acrylic acid containing the same is important for producing pure acrylic acid. As regards such a process, only several processes have hitherto been proposed including British Patents Nos. 997,324, 997,325, etc. Those processes comprise cooling the product obtained by vapor phase oxidation of propylene or acrolein, absorbing same in water to obtain an aqueous solution of acrylic acid containing acetic acid and evaporating water therefrom. Alternatively, the aqueous solution of acrylic acid is subjected to extraction by adding a suitable solvent thereto to extract acrylic acid as well as acetic acid and the resulting extract is distilled to separate the solvent from acrylic acid containing acetic acid and then acetic acid is removed therefrom by distillation under reduced pressure to obtain pure acrylic acid.

Another proposed process involves adding a suitable solvent capable of extracting only acrylic acid to an aqueous solution of acrylic acid. This method, however, requires a large amount of solvent and there is a considerable loss of acrylic acid accompanied by the loss of the solvent.

In the aforesaid common distillation, the specific volatilities of acrylic acid and acetic acid are so small that a large number of plates is required in the distilling column and the reflux ratio must be increased. This is disadvantageous in practical application on an industrial scale. Moreover, since acrylic acid is easily polymerized, the separation is generally carried out in the presence of a polymerization inhibitor. Even though, so-called popcorn polymerization often occurs, and causes a blockage in the distilling column. This means that the greater the number of plates there are, the less advantageous is the process. In the distilling column it is desirable to decrease the number of plates where acrylic acid is present in a high concentration but in a binary system of acrylic acid and acetic acid, the number of plates necessarily increases due to the relation between the specific volatilities of acetic acid and acrylic acid and their concentrations.

After thoroughly studying the above distillation, the present inventors have succeeded in obtaining pure acrylic acid with good efficiency by adding an entrainer which forms an azeotrope with acetic acid.

That is, it has now been found that acetic acid can readily be separated from acrylic acid by distillation when an entrainer capable of forming an azeotropic mixture with acetic acid is present. The entrainer comprises two groups of components. The first group of components includes aliphatic or alicyclic hydrocarbons having 7 carbon atoms or toluene or a mixture thereof. The second group of components includes water, esters of the chemical formula $R_1COOR_2$, wherein $R_1$ is a hydrocarbon radical having 1–3 carbons and $R_2$ is a hydrocarbon radical having 1–4 carbons, whose boiling point does not exceed 130° C., nitriles having from 2 to 4 carbon atoms, and any mixtures thereof. The first component alone may be used but the effect can be further increased by the addition of the second component.

When the first component only is used as an entrainer in the azeotropic distillation, the first component forms an azeotropic mixture with acrylic acid even though in a small amount. Accordingly, a part of the acrylic acid will necessarily be distilled out when distilling acetic acid. However, when the second component is added to the first component, substantially no acrylic acid enters the acetic acid distillate. The mixing ratio of the first component to the second component is 1 mol of the former to 0.05–1.5 moles of the latter, preferably 0.2–1.5.

The first component is selected so as to form an azeotropic mixture with acetic acid but not with acrylic acid, and n-heptane is desirable as the aliphatic hydrocarbon of seven carbon atoms. In the case of the first component, when the number of carbon atoms is less than 6, an azeotropic mixture with acetic acid is not formed and on the other hand, when the number of carbon atoms is more than 8 the separation of acetic acid from acrylic acid becomes difficult, and therefore neither case is suitable.

The amount of the second component to be added is required to be not less than 0.05 mol per mol of the first component but when it exceeds 2.0 moles it restrains the action of the first component, with the result that acetic acid is hardly distilled out at the head of the column. It is therefore, preferable to use from 0.2 to 1.5 moles.

Ketones and ethers have a similar effect as the second component, but are not preferable because acrylic acid is not stable and easily polymerizes in the presence of such compounds. Accordingly, from an industrial point of view, ethyl acetate, methyl acrylate, propyl acetate, ethyl acrylate, acetonitrile, acrylonitrile and water are preferable as the second component.

In effecting azeotropic distillation by the use of the entrainer consisting of the first and second components, in order to avoid the polymerization of acrylic acid, it is necessary to carry out the distillation under a reduced pressure of less than 350 mm. Hg abs. with the use of a known polymerization inhibitor, for example, hydroquinone, hydroquinone monomethyl ether, phenothiazine, oxygen, etc.

As for the method of introducing the entrainer, it may be introduced into the column from the head as in the case of usual azeotropic distillation or into an enriching zone of the column or into the starting feed. Alternatively, a part or all of the first component may be mixed into the starting feed and a part or all of the second component from the head of the column, i.e., not only from one region but also from two or more regions.

In the distillation according to the present method the distillate does not always form two liquid layers as is often seen. When the distillate azeotrope does not form two liquid layers, acetic acid may be removed therefrom by extraction with water or acetonitrile or neutralization or esterification or by other known methods. The remaining liquor from which acetic acid has been removed can be used again as an entrainer.

In the process for the production of acrylic acid by the vapor phase oxidation reaction of propylene or acrolein, usually not more than 40% by weight, preferably 10–30% of a crude aqueous acrylic acid solution is obtained and it contains an amount of acetic acid from ¼ to $\frac{1}{500}$ (mol ratio) based on the acrylic acid. A very convenient process can be established when the above aqueous solution is processed by a combination of the azeotropic distillation and the extraction.

That is, the crude acrylic acid solution containing acetic acid is contacted beforehand with a mixed solvent consisting of the first and the second components excluding water-soluble components, for example, water, acetonitrile and methyl acetate, to extract acrylic acid from the crude solution and then the extract is distilled, thereby the acetic acid as well as the solvent can be distilled out from the top of the distillation column while acrylic acid free from acetic acid is obtained from the bottom. The distillate may if desired by recycled after acetic acid is taken off. Even when the solvent containing acetic acid is reused, the acetic acid does not accumulate too much in the contacting step and is discarded from the contacting system as raffinate.

In the composition of the thus obtained extract to the distilling column (hereinafter referred to as the solvent separation column) where the solvent is to be removed, the mol ratio of the second component to the first component is preferably from 0.2 to 1.5 to 1. Therefore, when the solvent is introduced into the contacting column (hereinafter referred to as the extraction column) where acrylic and acetic acid are extracted, the mol ratio of the second component to the first component in the extraction solvent is naturally determined so as to come from 0.2 to 1.5 to 1. In the composition of the solvent thus determined, the extraction of acrylic acid becomes insufficient in some cases according to the kind of solvent used. In such a case, the insufficiency of extraction can be overcome by increasing the amount of the second component, which is hardly soluble in water. However, difficulty often occurs in distilling out all of the acetic acid as overhead from the solvent separation column when the proportion of the second component in the composition of the feed of the solvent separation column increases too much. In such a case, a dehydrating tower is placed between the extraction column and the solvent separation column to distil off a part or all of the water and/or a part of the solvent so as to make the mol ratio of the second component to the first component in the dehydrating tower equal to 0.2 to 1.5 to 1, and then the resulting bottoms are fed to the solvent separation column.

Figure 2:
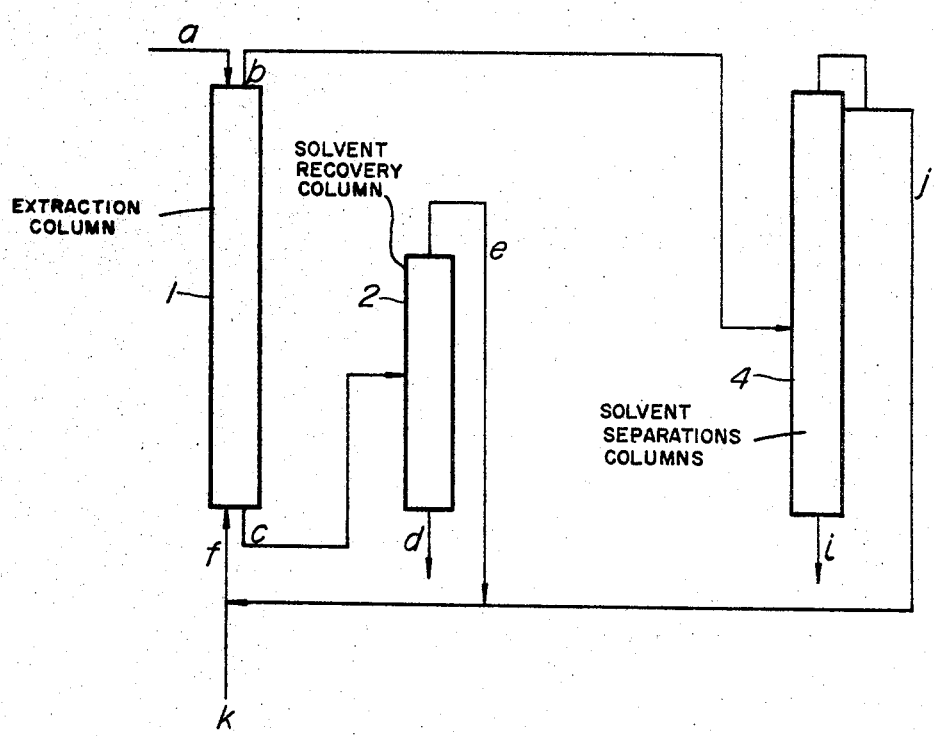

In the drawing, FIGURE 1 shows one embodiment of the present invention and FIGURE 2 shows another embodiment thereof. FIG. 2 illustrates the process wherein the extract $b$ is fed directly to the solvent separation column as described below in Example 6.

An aqueous acrylic acid solution containing acetic acid is introduced from $a$ into the top of an extraction column 1, and an extraction solvent substantially containing the first component, the second component and a small amount of acetic acid is introduced countercurrently from $f$. An extract containing acrylic acid and acetic acid is obtained from $b$. The weight ratio of the feed liquor from $a$ to the extraction solvent from $f$ is 1:0.6–5, preferably 1:0.8–3.

The extract liquor is dehydrated at a dehydrating tower 3 and then fed into a solvent separation column 4 through $g$. The dehydrating tower may be operated under normal pressure or reduced pressure and when the distillate forms two liquid layers upon condensation, only an oily layer is refluxed to the tower, and thus the dehydration can be readily carried out. The solvent separation column is preferable to carry out the distillation under a reduced pressure of less than 350 mm. Hg abs. in order to avoid an increase in the polymerization due to an increase in the concentration of acrylic acid in the solvent separation column. From $i$ of the solvent separation column 4, acrylic acid substantially free from acetic acid is obtained. The distillate $j$ of solvent separation column 4, the distilulate $h$ from the dehydrating tower 3 and recovered solvent $e$ from the solvent recovering column 2 and a make up $k$ for solvent loss may be combined as the extraction solvent $f$. The recovered solvents may be returned to the extraction column 1 combining all together or individually. As to the behavior of acetic acid contained in the solvent introduced from $f$, when the operation of the processes achieves a steady state, a fixed amount of acetic acid is constantly recycled from $b$ to $f$ passing through $j$, whereby the removal of acetic acid contained in the feed liquor can be continuously carried out, because the same amount of acetic acid is contained in the residue as in the feed of the extraction column. The residue of the extraction column is introduced from $c$ into the solvent recovery column 2, thereby recovering the solvent contained in said liquor. A diluted aqueous solution of acetic acid is obtained from $d$ and acetic acid can be recovered therefrom by any known method.

In order to prevent the polymerization of acrylic acid in each step of the aforementioned process, a known polymerization inhibitor, for example, hydroquinone, phenothiazine, oxygen, etc., is used.

Any type of the extraction column 1 may be used, for example, mixer-settler, packed column, perforated plates column or a column having turning blades and pulse generating devices are all usable.

Furthermore, the continuous layer of the extraction column may be either a water layer or organic layer. The extraction temperature is preferably from 0° to 60° C. In some cases, a three phase liquid is formed according to the kind of the first component and the second component which is hardly soluble in water, the mixing ratio thereof and the concentration of acid, etc. In such a case, a two phase liquid is conveniently obtained by elevating the temperature or replacing a part, i.e., less than three tenths of the first component with benzene, so that the zone which forms the three phase liquid is narrowed.

The following examples are given to illustrate the invention but they are not to be construed as limitative of its scope.

EXAMPLE 1

Solutions consisting of ethyl acetate, n-heptane, acetic acid and acrylic acid, and mixtures thereof to which water is added, were fed with a constant feed pump at a rate of 20 g./hr. into the middle of a triple tubular type glass distilling column of 2000 mm. high and of 20 mm. in diameter (packed with coiled wires of stainless steel SUS 27 of 3.5 mm. in diameter and a length of 3.5 mm. of the trade name Naniwa Pack No. 3).

The distillation was continuously carried out under operating pressure of 175 mm. Hg, with a reflux ratio of 1.1, and a column bottom temperature of 99°–101° C. and a column head temperature of 41°–45° C.

The distillations of feeds having various compositions were carried out and the results obtained were as shown in the following table.

TABLE

| Experiment No.: | | EtAc | n-Hep | HAc | HAcr | Water | Other heavy substance | b/a (weight ratio) | Mol ratio in b EtAc/n-Hep |
|---|---|---|---|---|---|---|---|---|---|
| 1 | a | 37.9 | 33.2 | 3.5 | 25.4 | | 0 | 2.94 | 1.3 |
| | b | 50.9 | 44.5 | 4.6 | 0 | | 0 | | |
| | c | 0 | 0.1 | 0.2 | 99.0 | | 0.7 | | |
| 2 | a | 46.1 | 35.2 | 2.3 | 16.5 | | 0 | 5.06 | 1.5 |
| | b | 55.1 | 42.1 | 2.73 | 0 | | 0 | | |
| | c | 0 | 0 | 0.1 | 99.4 | | 0.5 | | |
| 3 | a | 21.2 | 60.5 | 2.2 | 15.9 | | 0 | 5.28 | 0.4 |
| | b | 25.2 | 72.1 | 2.6 | 0 | | 0 | | |
| | c | 0 | 0 | 0.1 | 99.4 | | 0.5 | | |
| 4 | a | 14.5 | 40.9 | 5.4 | 39.1 | | 0 | 1.56 | 0.4 |
| | b | 28.9 | 67.4 | 8.7 | 0 | | 0 | | |
| | c | 0 | 0 | 0.3 | 99.2 | | 0.5 | | |
| 5 | a | 32.7 | 21.7 | 5.6 | 40.0 | | 0 | 1.47 | 1.7 |
| | b | 55.2 | 36.6 | 8.15 | 0 | | 0 | | |
| | c | 0 | 0 | 1.8 | 97.7 | | 0.5 | | |
| 6 | a | 9.0 | 45.0 | 6.0 | 40.0 | | 0 | 1.54 | 0.22 |
| | b | 14.8 | 74.2 | 9.8 | 1.2 | | 0 | | |
| | c | 0 | 0 | 0.1 | 99.8 | | 0.4 | | |
| 7 | a | 22.9 | 43.6 | 3.8 | 27.4 | 2.3 | 0 | 2.65 | 0.6 |
| | b | 31.6 | 60.1 | 5.1 | 0 | 3.07 | 0 | | |
| | c | 0 | 0.1 | 0.4 | 99.0 | 0.08 | 0.4 | | |
| 8 | a | 33.9 | 33.8 | 3.6 | 28.0 | 0.7 | 0 | 2.61 | 1.1 |
| | b | 47.2 | 47.1 | 4.9 | 0 | 0.8 | 0 | | |
| | c | 0 | 0.05 | 0.2 | 99.5 | 0.05 | 0.2 | | |
| 9 | a | 31.0 | 35.2 | 3.8 | 27.7 | 2.3 | 0 | 2.61 | 1.0 |
| | b | 42.9 | 48.8 | 4.8 | 0 | 3.1 | 0 | | |
| | c | 0 | 0.1 | 1.8 | 98.0 | 0.1 | 0.5 | | |

Wherein, $a$ is the feed, $b$ is the distillate, $c$ is column bottom liquor, EtAc is ethyl acetate, n-Hep is n-heptane, HAc is acetic acid, and HAcr is acrylic acid.

As is clear from the above table, the ease of separation of acetic acid and acrylic acid varies according to the mol ratio of ethyl acetate to n-heptane. As shown in Experiment 5, in case of ethyl acetate/n-heptane=1.7 (mol ratio), a considerable amount of acetic acid remains at the column bottom, but by making this ratio smaller, acetic acid does not remain at the column bottom and it distils out from the column head, and conversely acrylic acid is not contained in the distillate. Such an ideal or optimum ratio of ethyl acetate/n-heptane may considerably be affected by the concentrations of acrylic acid and acetic acid but in the present examples, a ratio in the range of 0.2–1.5 to 1 is considered suitable and in this case 99% of acetic acid is removed from the column head without any acrylic acid loss.

If the ratio is further reduced, as shown in Experiment 6, acrylic acid is contained in the distillate liquor in a large amount.

Experiments 7–9 show the cases where water is present. As shown in Experiments 7–9, a mol ratio of ethylacetate and water to n-heptane in the range of 0.5–1.5 to 1 is also considered to be suitable.

Furthermore, this example and subsequent examples were carried out with the addition of 0.2% of hydroquinone monomethyl ether as a polymerization inhibitor.

Under the same conditions as in this example, the direct separation of acrylic acid and acetic acid was carried out without using n-heptane and the following results were obtained.

| | Flow rate | Composition (percent by weight) | | |
|---|---|---|---|---|
| | | Acrylic acid | Acetic acid | High heavy substances |
| Feed | 25.0 | 84.0 | 16.0 | |
| Distillate | 5.8 | 44.3 | 55.7 | |
| Bottom | 19.2 | 95.4 | 4.1 | 0.5 |

In the above case, it is obvious that the separation is incomplete, compared with that of the azeotropic distillation.

EXAMPLE 2

The separation of acetic acid and acrylic acid was carried out by the azeotropic distillation with the same distilling column made of glass as in the Example 1, using n-heptane as entrainer.

The distillation was continuously carried out under a pressure of 175 mm. Hg while feeding the feed liquor consisting of 84% of acrylic acid and 16% of acetic acid into the column at a position ⅓ from the bottom of the column with a constant feed pump at a flow rate of 25.0 g./hr., maintaining the column bottom liquor at 100°–101° C. and adding n-heptane thereto from the reflux inlet at the rate of 13.4 g./hr.

The distillate liquor was countercurrently washed with water at the rate of 8.8 g./hr. with a two-stage mixer settler and there was obtained wash water of the following composition at a rate of 13.7 g./hr.

| | Percent |
|---|---|
| Acrylic acid | 6.0 |
| Acetic acid | 29.3 |
| Water | 63.2 |
| n-Heptane | 1.5 |

The water washed layer was almost completely composed of n-heptane and a bit of water was recycled as the refluxing liquor by making up a small amount of n-heptane corresponding to that which is transferred into the wash water.

A small amount of n-heptane contained in the wash water can be recovered by known methods; recovery was not undertaken in the present example.

The column bottom were obtained at a rate of 20.4 g./hr. and the composition thereof was as follows:

| | Percent |
|---|---|
| Acrylic acid | 98.4 |
| Acetic acid | Trace |
| n-Heptane | 0.6 |
| Other heavy substances | 0.6 |

Thereby, the yield of acrylic acid was 95.5%.

On the occasion of the afore-mentioned azeotropic distillation, in the same way as in Example 2 the azeotropic distillation was carried out but using n-heptane as an entrainer added thereto at a rate of 20.0 g./hr., simultaneously, together with water at a rate of 0.54 g./hr. and as a result, the following result was obtained.

| | Flow rate (g./hr.) | Composition (percent by weight) | | | |
|---|---|---|---|---|---|
| | | Acrylic acid | Acetic acid | n-Heptane | Water |
| Feed | 25.0 | 84.0 | 16.0 | | |
| Water washing [1] | 13.1 | 0.8 | 30.6 | 1.5 | 67.2 |
| Bottom distillate [2] | 21.0 | 99.1 | Trace | 0.5 | |

[1] Obtained by washing the distillate with water at a rate of 8.8 g./hr.
[2] Besides those mentioned herein, 0.6% of high boiling point substance existed.

In the above case, the recovery rate of acrylic acid was 99.1%, and it is therefore, obvious that if the distillation is carried out by allowing water to be present in the optimum amount, the amount of acrylic acid in the distillate is reduced, thereby improving the effect of the separation.

EXAMPLE 3

The azeotropic distillation was carried out using n-heptane as an entrainer in the presence of acetonitrile under a pressure of 175 mm. Hg with the same distilling column made of glass as in Example 1.

N-heptane saturated with acetonitrile (containing 2.5% of acetonitrile) was added thereto at a rate of 15.9 g./hr. from a reflux inlet at the top of the column.

The distillation was continuously carried out while feeding a solution consisting of 10.8% of acetic acid and 89.2% of acrylic acid at a rate of 34.8 g./hr. into the column at the ⅓ position from the column bottom, and as a result, a column bottom of the following composition was obtained at a rate of 30.4 g./hr.

|  | Percent |
|---|---|
| Acrylic acid | 99.3 |
| Acetic acid | Trace |
| n-Heptane | 0.3 |
| Other heavy substances | 0.4 |

The distillate liquor was washed with acetonitrile containing 9.1% of n-heptane at a rate of 11.1 g./hr. to obtain a washing liquor of the following composition at a rate of 14.8 g./hr.

|  | Percent |
|---|---|
| Acrylic acid | Trace |
| Acetic acid | 25.0 |
| n-Heptane | 6.7 |
| Acetonitrile | 68.3 |

The washing liquor was distilled by another distillation column under normal pressure to obtain acetic acid from the column bottom. The distillate liquor was acetonitrile containing 9.1% of n-heptane and was recycled again as washing liquor. The liquor washed with water was n-heptane saturated with acetonitrile containing hardly any acid and was recycled as an entrainer of the azeotropic distillation column.

In the persent example, acrylic acid was refined with 99.3% yield, recovering high purity acrylic acid from the column bottom as well as hardly distilling out acrylic acid from the column head.

EXAMPLE 4

The azeotropic distillation was carried out using toluene as an entrainer in the presence of ethyl acrylate with the same distilling column as in Example 1.

The entrainer consisting 25.6% of ethyl acrylate, 72.7% of toluene and about 1.1% of water saturated therewith was added to the column at a rate of 18.0 g./hr. under a pressure of 175 mm. Hg from a reflux inlet at the top of the column.

The feed consisting of 10% of acetic acid and 90% of acrylic acid was fed at a rate of 25.0 g./hr. into the column at the ⅓ position from the column bottom. The distillation was continuously carried out to obtain a column bottom liquor of the following composition at a rate of 22.5 g./hr.

|  | Percent |
|---|---|
| Acrylic acid | 99.1 |
| Acetic acid | Trace |
| Toluene | 0.4 |
| Other heavy substances | 0.5 |

The distillate was countercurrently washed with water at a rate of 6.3 g./hr. with a two-stage mixer-settler and the resulting washing water of the following composition was obtained at a rate of 8.8 g./hr.

|  | Percent |
|---|---|
| Acrylic acid | Trace |
| Acetic acid | 27.3 |
| Water | 71.4 |
| Ethyl acrylate | 1.2 |
| Toluene | Trace |

The water washed liquor was returned to the column again as an entrainer from the top of the column while supplementing a corresponding amount of ethyl acrylate to that amount which had been transferred into the washing water.

In the present example, highly pure acrylic acid was obtained from the column bottom with a recovery rate of 99.1%, and at the same time acrylic acid was hardly distilled out from the column head.

EXAMPLE 5

As the extraction column illustrated in the drawing, packed column 270 cm. in height and 1.0 cm. diameter (packed with the same packing as in Example 1) was used. The extraction was countercurrently carried out while pouring an aqueous solution containing 25% by weight of acrylic acid (hereinafter all percent referred to are percent by weight) and 4% of acetic acid as the feed liquor into the column from the column head with a constant feed pump at a rate of 13.6 g./hr., quantitatively introducing an extraction solvent consisting of 59.5% of ethyl acetate, 39.6% of n-heptane and 0.9% of water into the column from the column bottom at the rate of 19.0 g./hr., and maintaining the liquid at 30° C.

As a result, an extract of the following composition was obtained at a rate of 23.0 g./hr.

|  | Percent |
|---|---|
| Acrylic acid | 14.7 |
| Acetic acid | 1.7 |
| Ethyl acetate | 47.1 |
| n-Heptane | 32.6 |
| Water | 3.9 |

The extract liquor was fed into the middle of the dehydrating tower as shown in the drawing and dehydrated by continuous distillation.

As the dehydrating tower, a triple tubular distilling column made of glass having an inside diameter of 2.0 cm. and height of 120 cm. (the packing substance is the aforementioned Naniwa Pack) was used. The distillation was carried out under normal pressure, with reflux ratio of 0.5, at a column head temperature of 67°–68° C. and a column bottom temperature of 91°–92° C., and as a result, the following was obtained.

| Flow rate, g./hr. | Composition (percent by weight) | | | | |
|---|---|---|---|---|---|
| | Acrylic acid | Acetic acid | Water | Ethyl acetate | n-Heptane |
| Distillate | 10.6 | | | 0.85 | 68.8 | 22.7 |
| Bottom | 12.4 | 27.8 | 3.1 | 0.05 | 28.6 | 41.0 |

The distillate forms two liquid phases, and the ratio of organic layer to water-layer is about 14 to 1.

Next, the tower bottom liquor of the dehydrating tower was fed into the middle of the solvent separation column as shown in the drawing and the separation of acrylic acid and the other components was carried out. As the solvent separation column, the same type of column as the dehydrating tower was used, but it was 200 cm. high.

The distillation was continuously carried out while introducing the feed with a constant feed pump into the middle of the column at a rate of 12.4 g./hr. with the reflux ratio of 0.8, under an operating pressure of 175 mm. Hg and at a column bottom temperature of 100° C. and as a result, the following was obtained.

|  | Flow rate, g./hr. | Composition (percent by weight) | | | | |
| --- | --- | --- | --- | --- | --- | --- |
|  |  | Acrylic acid | Acetic acid | Ethyl acetate | n-Heptane | Other heavy substance |
| Distillate | 9.0 |  | 4.2 | 39.3 | 56.4 |  |
| Bottom | 3.4 | 99.5 | 0.2 |  |  | 0.3 |

Thus, acrylic acid containing a very small amount of acetic acid with recovery yield of 99.3% is obtained from an aqueous solution of acrylic acid.

Next, as shown in the flow sheet of the drawing, when the portion of organic layer of the distillate of the dehydrating tower and the recovered solvent from the raffinate of the extraction column by distillation (substantially ethyl acetate with a trace of n-heptane) and the organic layer of the distillate of the solvent separation column which contained acetic acid were combined together, with ethyl acetate and n-heptane being added in amounts corresponding to those which had been lost during the operations were added respectively thereto and it was recycled as the extraction solvent, the concentration of acetic acid in the extract increased slightly to 2.1% but the composition of the column bottoms of the solvent separation column was not affected by the recycling of said solvent.

Furthermore, this example and subsequent example were carried out with the addition of 0.2% of hydroquinone monomethyl ether as the polymerization inhibitor.

EXAMPLE 6

An aqueous solution containing 20.0% of acrylic acid and 2.67% of acetic acid was introduced at a flow rate of 15.0 g./hr. into the same extraction column as in Example 5 through the column head and a mixed solvent, of which the weight ratio of n-heptane to ethyl acrylate was 1 to 1, containing saturated water therewith was added at a rate of 21.0 g./hr. from the column bottom. The liquid-liquid extraction was carried out at 30° C. and as a result, an extract liquor of the following composition was obtained from the column head at a flow rate of 24.4 g./hr.

|  | Percent |
| --- | --- |
| Acrylic acid | 12.3 |
| Acetic acid | 1.1 |
| Ethyl acrylate | 42.1 |
| n-Heptane | 42.9 |
| Water | 1.5 |

Thus, in this extraction column, acrylic acid and acetic acid contained in an aqueous solution were extracted in 99.3% and 70% yield, respectively.

The extract liquor was directly fed into the same solvent separation column as in Example 5 and the distillation was carried out under a pressure of 175 mm. Hg., at a column bottom temperature of 100° C. and with the reflux ratio of 1.3 to distil off solvent, water and acetic acid. The result was as shown below.

|  | Flow rate, g./hr. | Composition (percent by weight) | | | | |
| --- | --- | --- | --- | --- | --- | --- |
|  |  | Acrylic acid | Acetic acid | n-Heptane | Ethyl acetate | Water |
| Distillate | 21.2 |  | 1.3 | 49.0 | 48.0 | 1.7 |
| Bottom | 3.01 | 98.9 | 0.3 | 0.05 | 0.3 |  |

Furthermore, the column bottoms contained 0.4% of high boiling point substance.

As can be seen from the above, acrylic acid containing a very small amount of acetic acid was obtained with recovery yield of 98.7% from an aqueous solution thereof.

EXAMPLE 7

To the column head of the same extraction column as in Example 5, as the feed liquor an aqueous solution containing 25.0% by weight of acrylic acid and 4.2% of acetic acid was fed at a rate of 15.5 g./hr. and was extracted at the liquor temperature of 30° C. with a mixed solvent consisting of 53.5% of ethyl acetate, 40.1% of n-heptane and 4.4% of benzene at the rate of 19.7 g./hr. and then was dehydrated with the dehydrating tower of Example 5 under normal pressure with the reflux ratio of 0.3. The tower bottoms of the dehydrating tower were distilled in the same solvent separation column as in Example 5 under a pressure of 175 mm. Hg. with the reflux ratio of 0.7, and as a result, the following was obtained.

|  | Flow rate, g./hr. | Composition (percent by weight) | | | | | | |
| --- | --- | --- | --- | --- | --- | --- | --- | --- |
|  |  | Acrylic acid | Acetic acid | Water | Ethyl acetate | n-Heptane | Benzene | Other heavy substances |
| Feed | 12.1 | 31.8 | 3.5 | 0.2 | 22.0 | 42.1 | 0.25 |  |
| Distillate | 8.23 |  | 5.0 | 0.2 | 32.2 | 62.2 | 0.36 |  |
| Bottom | 3.86 | 99.3 | 0.05 |  |  | 0.1 |  | 0.4 |

From an aqueous solution, acrylic acid was obtained in 99.1% yield.

EXAMPLE 8

To the column head of the same extraction column as in Example 5, as the feed liquor, an aqueous solution containing 20.0% by weight of acrylic acid and 3.1% of acetic acid was fed at a rate of 16.8 g./hr., subjected to extraction with a mixed solvent consisting of 59.1% of acrylonitrile, 39.4% of toluene and 1.5% of water at a rate of 19.2 g./hr. and at a liquor temperature of 40° C. and then the extract was dehydrated with the dehydrating tower of Example 5 under normal pressure with the reflux ratio of 0.1. The tower bottom liquor of the dehydrating tower was then distilled in the same solvent separation column as in Example 5 under a pressure of 140 mm. Hg. with the reflux ratio of 1.2 and as a result, the following was obtained.

|  | Flow rate, g./hr. | Composition (percent by weight) | | | | | |
| --- | --- | --- | --- | --- | --- | --- | --- |
|  |  | Acrylic acid | Acetic acid | Water | Acrylonitrile | Toluene | Other heavy substances |
| Feed | 11.3 | 28.1 | 2.8 | 0.1 | 20.8 | 48.7 |  |
| Distillate | 8.12 |  | 3.9 | 0.1 | 28.2 | 67.7 |  |
| Bottom | 3.18 | 99.1 | 0.1 |  |  | 0.2 | 0.6 |

From an aqueous solution, acrylic acid scarcely containing acetic acid was obtained in 98.3% yield.

We claim:

1. A method for separating acrylic acid from a mixture of acrylic acid and acetic acid by azeotropic distillation, said method comprising distilling the mixture at a pressure less than 350 mm. Hg in the presence of a polymerization inhibitor and an entrainer consisting of a first component which is at least one member selected from the group consisting of aliphatic and alicyclic hydrocarbons having 7 carbon atoms, and toluene and a second component which is at least one member selected from the group consisting of water, an ester of the formula: $R_1COOR_2$, wherein $R_1$ is a hydrocarbon radical of 1 to 3 carbon atoms and $R_2$ is a hydrocarbon radical of 1 to 4 carbon atoms, said ester having a boiling point of at most 130° C., and nitriles of 3 to 4 carbon atoms; said first and second components being present in a molar ratio of 1:0.05–1.5.

2. A method according to claim 1, wherein the mixture of acrylic acid and acetic acid further comprises water.

3. A method according to claim 1, wherein up to three tenths of the molar amount of the first component is replaced by benzene.

4. A method for separating acrylic acid from an aqueous solution of acrylic and acetic acids, said method comprising extracting acrylic and acetic acids from the aqueous solution with a solution consisting of a first component which is at least one member selected from the group consisting of aliphatic and alicyclic hydrocarbons having 7 carbon atoms, and toluene and a second component which is at least one member selected from the group consisting of water, an ester of the formula: $R_1COOR_2$, wherein $R_1$ is a hydrocarbon radical of 1 to 3 carbon atoms and $R_2$ is a hydrocarbon radical of 1 to 4 carbon atoms, said ester having a boiling point of at most 130° C., and nitriles of 3 to 4 carbon atoms, said first and second components being present in a molar ratio of 1:0.05–1.5, to obtain an extract, subjecting the thus obtained extract to azeotropic distillation to obtain acrylic acid as a bottom and a mixture consisting of acetic acid, the first component, the second component and water as a distillate, and recycling the distillate to the extracting step.

5. A method according to claim 4, wherein up to three tenths of the molar amount of the first component is replaced by benzene.

6. A method for separating acrylic acid from an aqueous solution of acrylic and acetic acids, said method comprising extracting acrylic and acetic acids from the aqueous solution with a solution consisting of a first component which is at least one member selected from the group consisting of aliphatic and alicyclic hydrocarbons having 7 carbon atoms, and toluene and a second component which is at least one member selected from the group consisting of water, an ester of the formula: $R_1COOR_2$, wherein $R_1$ is a hydrocarbon radical of 1 to 3 carbon atoms and $R_2$ is a hydrocarbon radical of 1 to 4 carbon atoms, said ester having a boiling point of at most 130° C., and nitriles of 3 to 4 carbon atoms to obtain an extract, subjecting the extract to distillation to remove at least a portion of the water and portions of the first and second components from the extract, to thereby regulate the molar ratio of the first component to the second component to a range of 1:0.05–1.5 and obtain a bottom, subjecting the thus obtained bottom to azeotropic distillation to separate acrylic acid as a bottom therefrom and a mixture consisting of acetic acid, the first component, the second component and water as a distillate and recycling the distillate to the extracting step.

7. A method according to claim 6, wherein up to three tenths of the molar amount of the first component is replaced by benzene.

References Cited

UNITED STATES PATENTS

| | | | |
|---|---|---|---|
| 1,668,380 | 5/1928 | Ricard | 203—15 |
| 1,860,553 | 5/1932 | Ricard et al. | 203—51 |
| 1,915,002 | 6/1933 | Ricard et al. | 203—15 |
| 2,854,385 | 9/1958 | Alheritiere | 203—16 |
| 3,337,740 | 8/1967 | Gray et al. | 203—69 |
| 3,344,178 | 9/1967 | Brown et al. | 203—15 |

WILBUR L. BASCOMB, JR., *Primary Examiner.*

U.S. Cl. X.R.

203—8, 15, 16, 51, 52, 53, 60, 68, 69, 70, 79, 80, 92, 96; 260—541